US009564616B2

(12) United States Patent
Matsumura et al.

(10) Patent No.: US 9,564,616 B2
(45) Date of Patent: Feb. 7, 2017

(54) SHIELDING LAYER OF BATTERY CELL STRUCTURE

(71) Applicant: INTEL CORPORATION, Santa Clara, CA (US)

(72) Inventors: Naoki Matsumura, San Jose, CA (US); Ramon C. Cancel Olmo, Hillsboro, OR (US); Allen Huang, Beaverton, OR (US); Mike M. Ngo, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 371 days.

(21) Appl. No.: 14/229,544

(22) Filed: Mar. 28, 2014

(65) Prior Publication Data

US 2015/0280178 A1 Oct. 1, 2015

(51) Int. Cl.
*H02J 7/00* (2006.01)
*H01M 2/02* (2006.01)
*H01M 2/10* (2006.01)
*H01M 10/0525* (2010.01)

(52) U.S. Cl.
CPC ......... *H01M 2/0287* (2013.01); *H01M 2/0275* (2013.01); *H01M 2/1022* (2013.01); *H01M 10/0525* (2013.01)

(58) Field of Classification Search
CPC ...................................... Y02E 60/12
USPC .......................................... 320/107
See application file for complete search history.

(56) References Cited

U.S. PATENT DOCUMENTS

| | | | | |
|---|---|---|---|---|
| 2008/0107963 A1* | 5/2008 | Lee | ..................... | H01M 2/0275 429/174 |
| 2011/0255250 A1* | 10/2011 | Dinh | ..................... | G03B 15/03 361/749 |
| 2014/0152245 A1* | 6/2014 | Choi | ..................... | H02J 7/0042 320/108 |
| 2016/0028051 A1* | 1/2016 | Yoon | ..................... | H01M 2/0212 429/185 |

* cited by examiner

Primary Examiner — Suresh Memula
(74) Attorney, Agent, or Firm — KED & Associates LLP

(57) ABSTRACT

A battery cell structure may include a battery cell, a first pouch layer to substantially surround the battery cell, a second pouch layer to substantially surround the first pouch layer, and a shielding layer in the battery cell structure.

11 Claims, 5 Drawing Sheets

SHIELDING LAYER OF BATTERY CELL STRUCTURE

BACKGROUND

1. Field

Embodiments may relate to a battery cell structure.

2. Background

Wireless charging may transfer energy between a transmitter and a receiver through an inductive coupling. A receiver may be provided in a system, such as a phone, a tablet, a laptop, etc. A wireless charging receiver may include a coil, a control integrated circuit (IC) and a shielding film.

BRIEF DESCRIPTION OF THE DRAWINGS

Arrangements and embodiments may be described in detail with reference to the following drawings in which like reference numerals refer to like elements and wherein.

DETAILED DESCRIPTION

In the following detailed description, like numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

Figure 1:
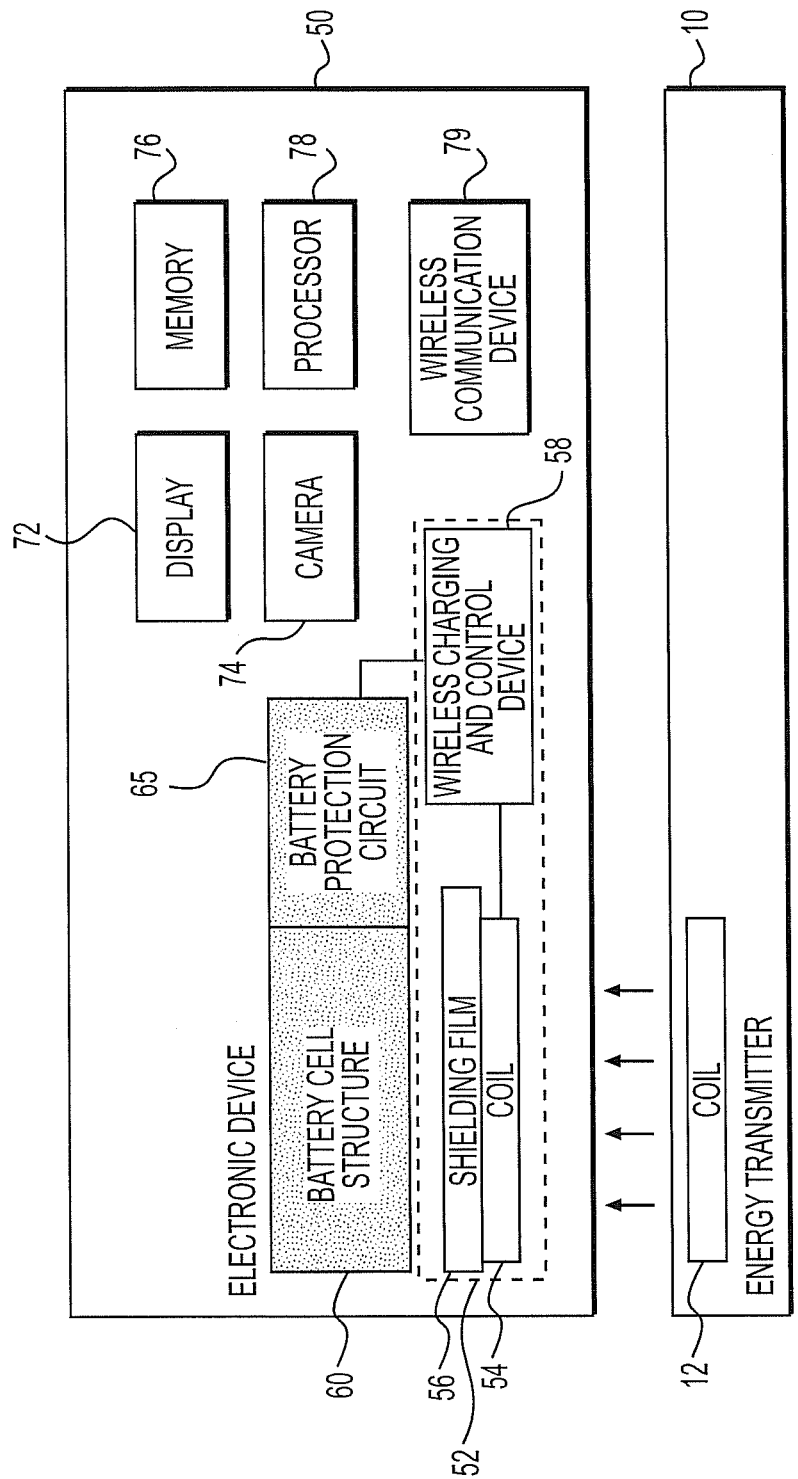
FIG. 1 shows a wireless charging system according to an example arrangement.

FIG. 1 shows a wireless charging system according to an example arrangement. Other arrangements may also be provided. FIG. 1 shows an example of a wireless charging system for charging a battery.

More specifically, FIG. 1 shows the wireless charging system includes an energy transmitter 10 (or transmitter) and an electronic device 50. The electronic device 50 may be a notebook computer, a laptop computer, a handheld computer, a tablet, an ultra-mobile personal computer (UMPC), a mobile Internet device (MID), a smartphone, a personal digital assistant (PDA), a mobile terminal and/or other similar device. The electronic device 50 may be an apparatus.

The electronic device 50 may include a display 72, a memory 76, a camera 74, a processor 78, and a wireless communication device 79. The display 72 may display an image. The processor 78 may perform operations by using received instructions, such as instructions received via a computer-readable medium. More or less components of the electronic device 50 may also be provided.

The electronic device 50 may also include a wireless charging receiver 52 (or receiver). The energy transmitter 10 may provide a magnetic charge to the wireless charging receiver 52. The magnetic charge may be based on a magnetic field.

The energy transmitter 10 may include a coil 12. The wireless charging receiver 52 may include a coil 54. The coil 12 of the energy transmitter 10 and the coil 54 of the wireless charging receiver 52 may provide a magnetic field between the energy transmitter 10 and the wireless charging receiver 52. The magnetic field (or magnetic charge) may be used to wirelessly charge a battery of the electronic device 50.

The wireless charging receiver 52 may also include a shielding film 56 (or shielding layer) and a wireless charging and control device 58 (or controller).

The electronic device 50 may also include a battery cell structure 60 (or battery cell) and a battery protection circuit 65. The wireless charging and control device 58 may control and/or communicate with the coil 54 and the battery protection circuit 65. The battery protection circuit 65 may provide voltage and/or current protection with regard to the battery cell structure 60.

The shielding film 56 may protect the battery cell structure 60 from receiving an electro-magnetic field and thereby overheating. As shown in FIG. 1, the shielding film 56 may be provided between the coil 54 and the battery cell structure 60.

The battery cell structure 60 may include a lithium-ion (Li-ion) battery cell. The battery cell may be provided in a pouch (or battery pouch).

The Li-ion battery cell may include at least a cathode, an anode, a separator, an aluminum (Al) current collector, and a copper (Cu) current collector. Other components of the Li-ion battery may also be provided.

The battery cell may be substantially surrounded by a pouch. As one example, the pouch may include a nylon pouch layer and/or aluminum pouch layer.

In at least one arrangement, the shielding film may include two double-sided adhesive tape layers, a polyethylene terephthalate (PET) film layer, and a shielding material layer. This type of shielding film may have a thickness of approximately 68 μm, for example. The shielding film, the nylon pouch layer and the aluminum pouch layer may have a total thickness of 128 μm, for example.

The wireless charging receiver 52 may be called a charging device. The charging device may charge a portion of the battery cell structure 60 while the battery cell structure is in a battery port of the electronic device 50. For example, the charging device may charge a battery cell of the battery cell structure. The charging device may include the coil 54, and a controller (such as the wireless charging and control device 58).

Embodiments may provide an electronic system or electronic device that includes a charging device, and a battery port to receive a battery cell structure (as will be described below).

Embodiments may provide an electronic device or system that includes a wireless receiver (or charging device) including a coil, and a battery cell structure.

Figure 2:
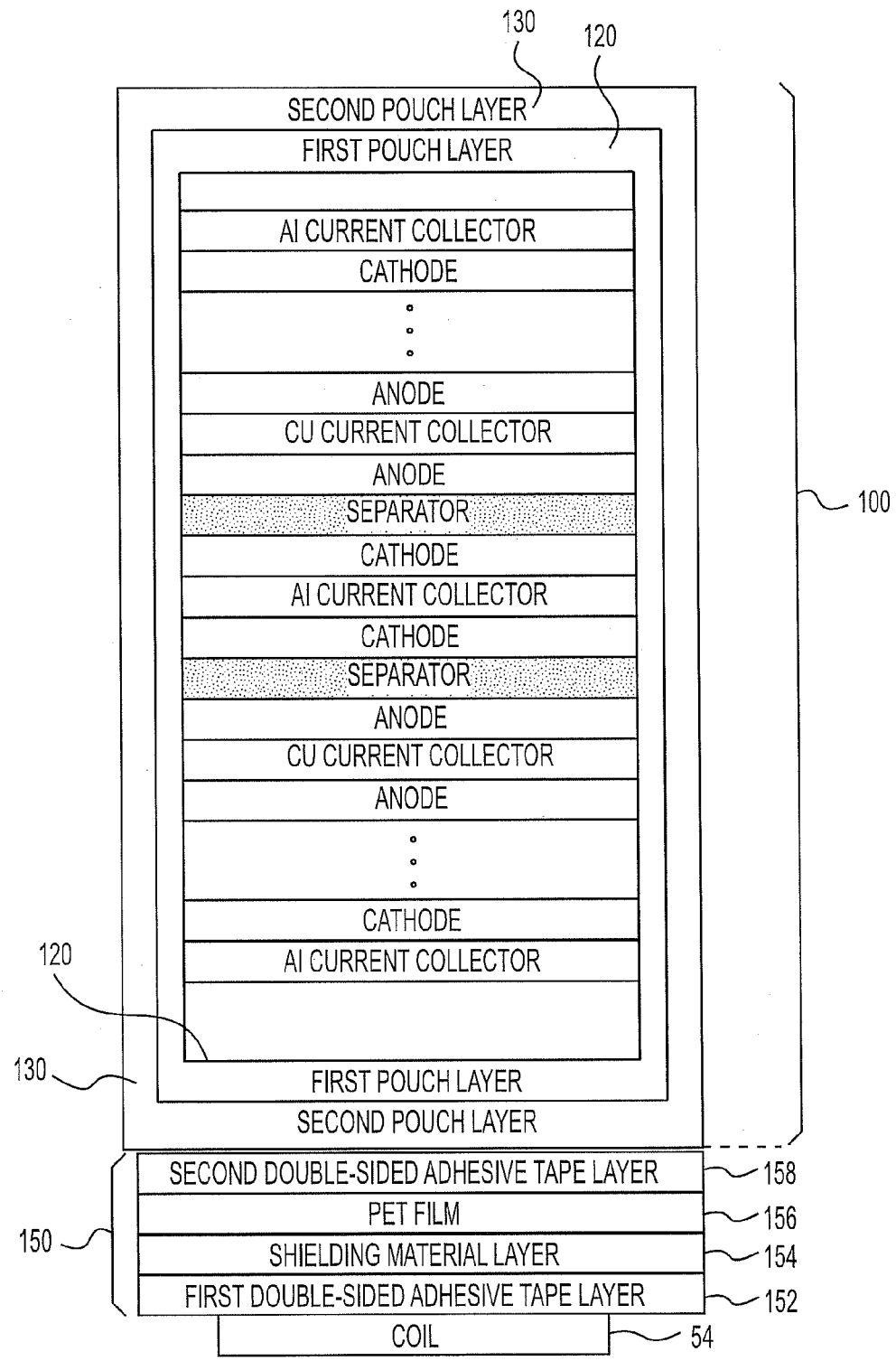
FIG. 2 is a side view of a battery cell and a shielding film according to an example arrangement.

FIG. 2 is a side view of a battery cell structure and a shielding film according to an example arrangement. Other arrangements may also be provided.

More specifically, FIG. 2 shows the coil 54, a shielding film 150 (or shielding layer) and a battery cell structure 100. The battery structure 100 may include at least one pouch and a battery cell. The battery cell may be provided within the battery pouch. The battery cell structure 100 may correspond to the battery cell structure 60.

The battery cell structure 100 may include a battery cell such as a lithium-ion (Li-ion) battery, for example. Other types of batteries (or battery cells) may also be provided.

In this arrangement, the shielding film 150 may include a first double-sided adhesive tape layer 152, a shielding material layer 154, a PET film 156 and a second double-sided adhesive tape layer 158. As one example, the first double-sided adhesive tape layer 152 may have a thickness of approximately 10 µm, the shielding material layer 154 may have a thickness of approximately 16 µm, the PET film 156 may have a thickness of approximately 32 µm and the second double-sided adhesive tape layer 158 may have a thickness of approximately 10 µm. Other thicknesses may also be provided.

FIG. 2 shows the battery cell includes numerous layers including current collectors, cathodes, anodes, and separators. The current collector may be an aluminum (Al) current collector and/or a copper (Cu) current collector, for example. The numerous components or layers may be provided in any of a number of different configurations. The structure of a cell may be, but is not limited to, the stacked-up structure. The winding structure may also be applied.

The stacked-up structure of the battery cell may include, in order, an Al current collector, a cathode, a separator, an anode, a copper current collector, an anode, a separator, a cathode, and an Al current collector. This stacked-up structure may be repeated at least once or may be repeated a plurality of times.

The battery cell may contain a liquid electrolyte with a Li-ion salt.

In another arrangement, a solid state electrolyte that provides Li-ion conductivity may be provided rather than a liquid electrolyte and a separator.

FIG. 2 also shows that the battery cell may be substantially surrounded by a battery pouch (or pouch). FIG. 2 shows the battery pouch as a first pouch layer 120 (or first pouch) and a second pouch layer 130 (or second pouch). The first pouch layer 120 may be an inner pouch layer, and the second pouch layer 130 may be an outer pouch layer that substantially surrounds the first pouch layer 120. As one example, the first pouch layer 120 may be an aluminum (Al) pouch layer. As one example, the second pouch layer 130 may be a nylon pouch layer. Other materials may be provided for the battery pouch and/or battery pouch layers.

As one example, the first pouch layer 120 may have a thickness of approximately 40 µm. As one example, the second pouch layer 130 may have a thickness of approximately 20 µm.

The first pouch layer 120 and the second pouch layer 130 may function to maintain liquid (such as a liquid electrolyte) within the battery cell structure 100 and/or to prevent moisture from outside the battery cell structure 100 from entering into the battery cell.

Figure 3:
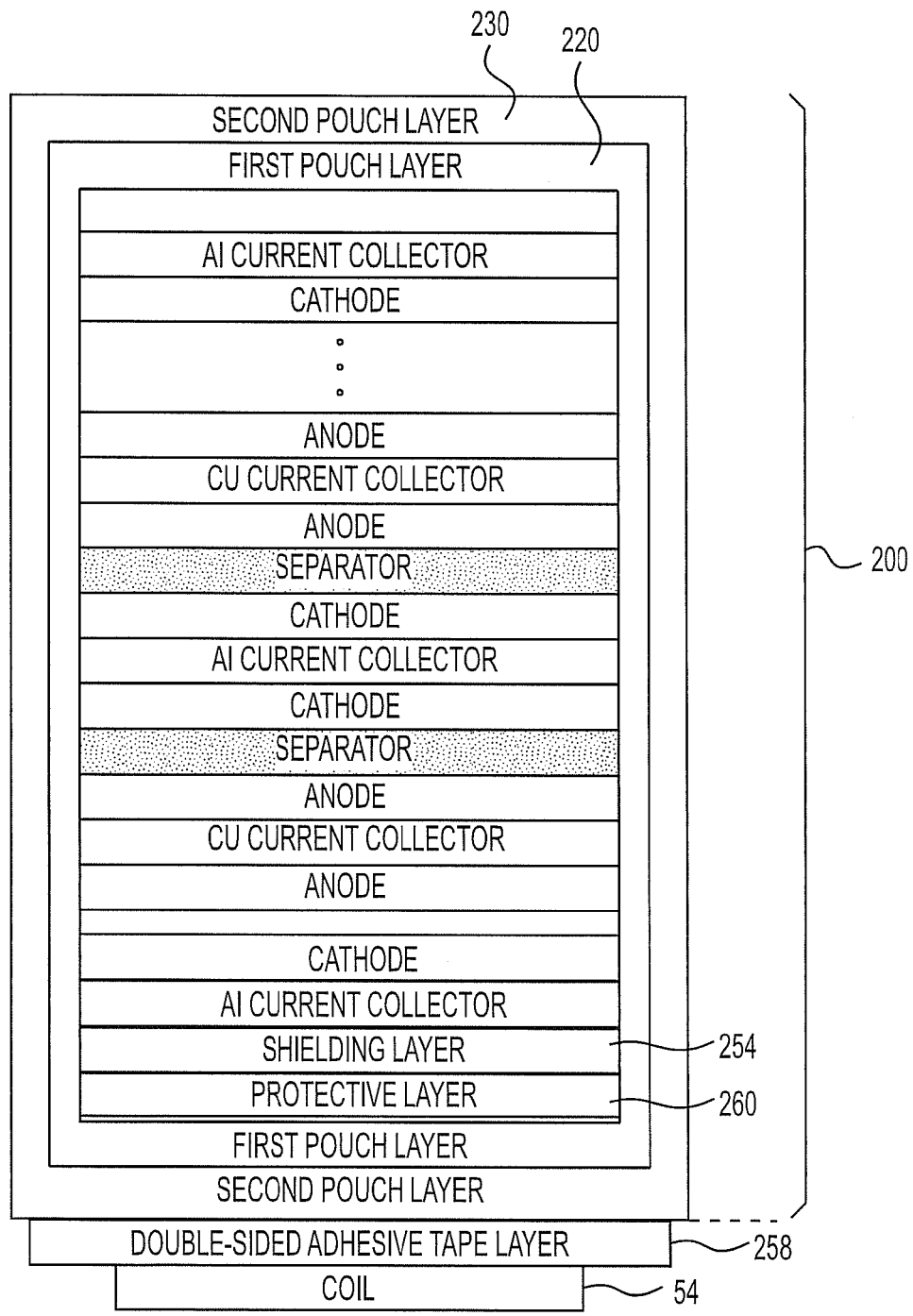
FIG. 3 is a side view of a battery cell and a shielding layer inside a battery cell structure according to an example arrangement.

FIG. 3 is a side view of a battery cell and a shielding layer inside a battery cell structure according to an example embodiment. Other embodiments and configurations may also be provided.

More specifically, FIG. 3 shows the coil 54, a double-sided adhesive tape layer 258 and a battery cell structure 200. The double-sided adhesive tape layer 258 may be coupled between the coil 54 and the battery cell structure 200.

The battery cell structure 200 may include at least one pouch layer (or pouch) and a battery cell. The battery cell may be provided within the battery pouch. The battery cell structure 200 may be provided in an electronic device in a similar manner as shown in FIG. 1.

The battery cell structure 200 may include a battery cell such as a lithium-ion (Li-ion) battery, for example. Other types of batteries (or battery cells) may also be provided.

In this embodiment, the double-sided adhesive tape layer 258 may be provided between the coil 54 and an outside pouch layer (or second pouch layer) of the battery cell structure 200. As one example, the double-sided adhesive tape layer 258 may have a thickness of approximately 10 µm. Other thicknesses may also be provided.

FIG. 3 shows the battery structure 200 includes numerous layers including current collectors, cathodes, anodes, and separators. The current collector may be an aluminum (Al) current collector and/or a copper (Cu) current collector, for example. The numerous components or layers may be provided in any of a number of different configurations.

The stacked-up structure of the battery cell may include, in order, an Al current collector, a cathode, a separator, an anode, a copper current collector, an anode, a separator, a cathode, and an Al current collector. This stacked-up structure may be repeated at least once or may be repeated a plurality of times.

The battery cell may contain a liquid electrolyte with a Li-ion salt.

In another arrangement, a solid state electrolyte that provides Li-ion conductivity may be provided rather than a liquid electrolyte and a separator.

FIG. 3 also shows that the battery cell may be substantially surrounded by a battery pouch (or pouch layer). FIG. 3 shows the battery pouch as a first pouch layer 220 (or first pouch) and a second pouch layer (or second pouch) 230. The first pouch layer 220 may be an inner pouch layer that substantially surrounds the battery cell, and the second pouch layer 230 may be an outer pouch layer that substantially surrounds the first pouch layer 220. As one example, the first pouch layer 220 may be an aluminum (Al) pouch layer. As one example, the second pouch layer 230 may be a nylon pouch layer. Other materials may be provided for the battery pouch and/or battery pouch layers.

The first pouch layer 220 may substantially surround the battery cell. The second pouch layer 230 may substantially surround the first pouch layer 220.

As one example, the first pouch layer 220 may have a thickness of approximately 40 µm. As one example, the second pouch layer 230 may have a thickness of approximately 20 µm.

The first pouch layer 220 and the second pouch layer 230 may function to maintain liquid (such as a liquid electrolyte) within the battery cell structure 200 and/or to prevent moisture from outside the battery cell structure 200 from entering into the battery cell.

FIG. 3 also shows that a protective layer 260 and a shielding layer 254 (or shielding material) may be provided inside the first pouch layer 220. The protective layer 260 may be an electrochemically protective layer. As one example, the protective layer 260 may be formed of aluminum and oxygen, such as $Al_2O_3$. The protective layer 260 may have a thickness of less than 0.1 µm. The shielding layer 254 may have a thickness of approximately 16 µm. Other thicknesses may also be provided.

FIG. 3 shows the shielding layer 254 (or shielding material) inside of the battery cell structure 200. The shielding layer 254 may be in the battery cell structure. The shielding layer 254 may be formed of iron, for example. Iron may dissolve in a Li-ion battery cell during charge and discharge and may cause safety issue(s). Therefore, the protective layer 260 on a surface of the shielding layer 254 (or shielding material) may prevent iron (and/or other substances in the shielding layer) from dissolving. The protective layer 260 may prevent the shielding layer 254 (or shielding material) from dissolving into electrolyte of the battery cell. The protective layer 260 may be formed of aluminum and oxygen, such as $Al_2O_3$, although other materials may also be used. The protective layer 260 may have a thickness of less than 0.1 μm, and may be provided by vacuum deposition. A total thickness of the shielding layer 254, the protective layer 260, the first pouch layer 220, the second pouch layer 230 and the double-sided adhesive tape layer 258 may be 86 μm. This may reduce a total thickness from approximately 128 μm (FIG. 2) to approximately 86 μm (FIG. 3). That is, this embodiment may reduce the total thickness of the above features by approximately 42 μm.

FIG. 3 shows that the shielding layer 254 is inside the first pouch layer 220 (and in the battery cell structure), and a portion of the first pouch layer 220 is between the shielding layer 254 and a portion of the second pouch layer 230. The protective layer 260 may be between the shielding layer 254 and the portion of the first pouch layer 220.

Figure 4:
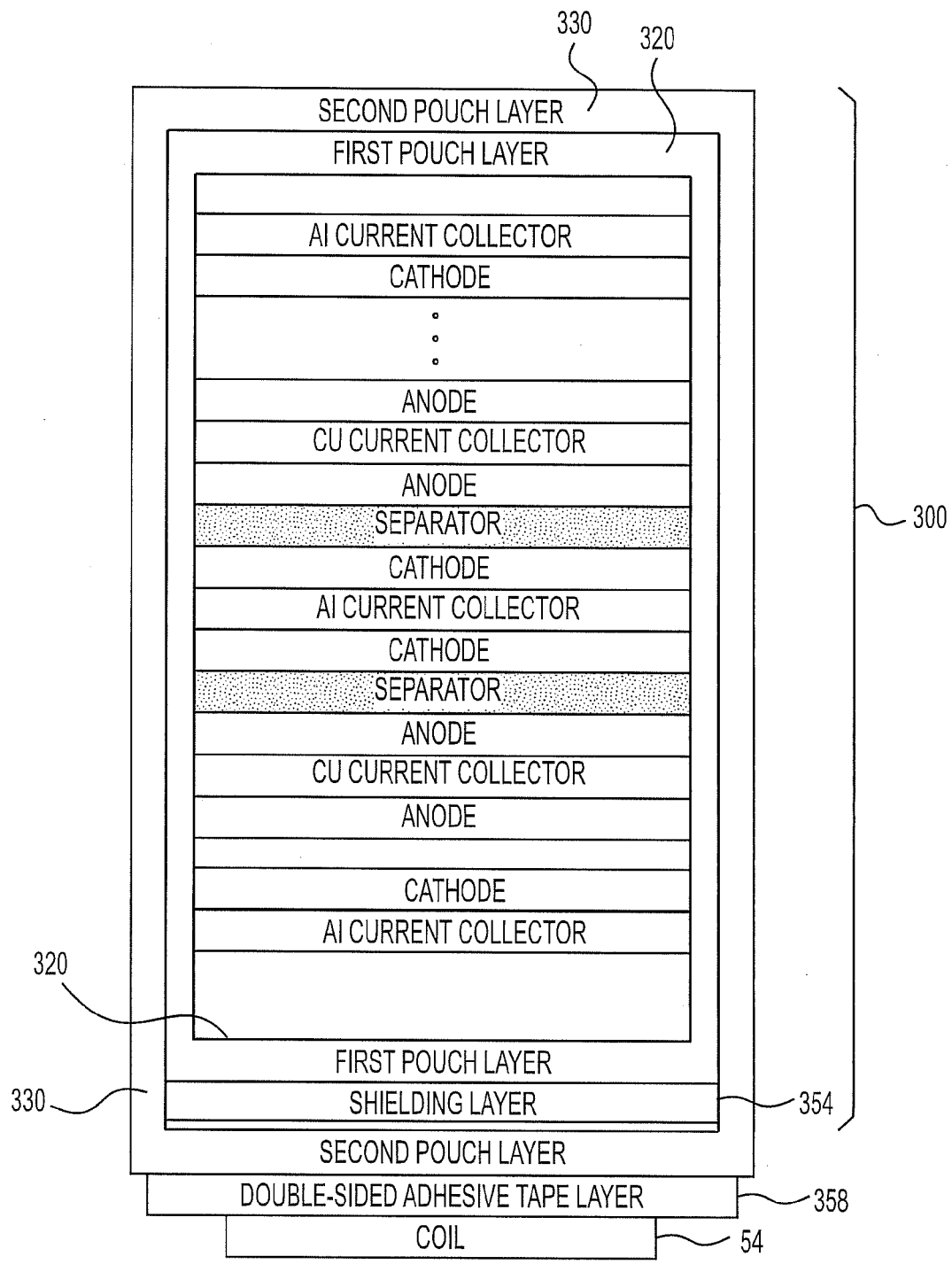
FIG. 4 is a side view of a battery cell and a shielding layer inside a battery cell structure according to an example arrangement.

FIG. 4 is a side view of a battery cell and a shielding layer inside a battery cell structure according to an example embodiment. Other embodiments and configurations may also be provided.

More specifically, FIG. 4 shows the coil 54, a double-sided adhesive tape layer 358 and a battery cell structure 300. The double-sided adhesive tape layer 358 may be coupled between the coil 54 and the battery cell structure 300.

The battery cell structure 300 may include at least one pouch layer (or pouch) and a battery cell. The battery cell may be provided within the battery pouch. The battery cell structure 300 may be provided in an electronic device in a similar manner as shown in FIG. 1.

The battery cell structure 300 may include a battery cell such as a lithium-ion (Li-ion) battery, for example. Other types of batteries (or battery cells) may also be provided.

In this embodiment, the double-sided adhesive tape layer 358 may be provided between the coil 54 and an outside pouch layer (or second pouch layer) of the battery cell structure 300. As one example, the double-sided adhesive tape layer 358 may have a thickness of approximately 10 μm. Other thicknesses may also be provided.

FIG. 4 shows the battery structure 300 includes numerous layers including current collectors, cathodes, anodes, and separators. The current collector may be an aluminum (Al) current collector and/or a copper (Cu) current collector, for example. The numerous components or layers may be provided in any of a number of different configurations.

The stacked-up structure of the battery cell may include, in order, an Al current collector, a cathode, a separator, an anode, a copper current collector, an anode, a separator, a cathode, and an Al current collector. This stacked-up structure may be repeated at least once or may be repeated a plurality of times.

The battery cell may contain a liquid electrolyte with a Li-ion salt.

In another arrangement, a solid state electrolyte that provides Li-ion conductivity may be provided rather than a liquid electrolyte and a separator.

FIG. 4 also shows that the battery cell may be substantially surrounded by a battery pouch (or pouch layer). FIG. 4 shows the battery pouch as a first pouch layer 320 (or first pouch) and a second pouch layer 330 (or second pouch). The first pouch layer 320 may be an inner pouch layer that substantially surrounds the battery cell, and the second pouch layer 330 may be an outer pouch layer that substantially surrounds the first pouch layer 320. As one example, the first pouch layer 320 may be an aluminum (Al) pouch layer. As one example, the second pouch layer 330 may be a nylon pouch layer. Other materials may be provided for the battery pouch and/or battery pouch layers.

The first pouch layer 320 may substantially surround the battery cell. The second pouch layer 330 may substantially surround the first pouch layer 330.

As one example, the first pouch layer 320 may have a thickness of approximately 40 μm. As one example, the second pouch layer 330 may have a thickness of approximately 20 μm.

The first pouch layer 320 and the second pouch layer 330 may function to maintain liquid (such as a liquid electrolyte) within the battery cell structure 300 and/or to prevent moisture from outside the battery cell structure 300 from entering into the battery cell.

FIG. 4 also shows that a shielding layer 354 (or shielding material) may be provided outside the first pouch layer 320 and inside the second pouch layer 330. The shielding layer 354 may have a thickness of approximately 16 μm. Other thicknesses may also be provided.

FIG. 4 shows the shielding layer 354 (or shielding material) in between the first pouch layer 320 (i.e., the aluminum pouch) and the second pouch layer 330 (or nylon pouch). The shielding layer 354 may be in the battery cell structure. The shielding layer 354 (or shielding material) does not contact an electrolyte inside the battery cell, and thus the shielding layer 354 (or shielding material) does not dissolve during charge and/or discharge. A total thickness of the first pouch layer 320, the shielding layer 354, the second pouch layer 330 and the double-sided adhesive tape layer 358 may be 86 μm. That may reduce a total thickness from approximately 128 μm (FIG. 2) to approximately 86 μm (FIG. 4). That is, this embodiment may reduce the total thickness of the above features by approximately 42 μm.

FIG. 4 shows that the shielding layer 354 is between a portion of the first pouch layer 320 and a portion of the second pouch layer 330. The shielding layer 354 is in the battery cell structure.

Figure 5:
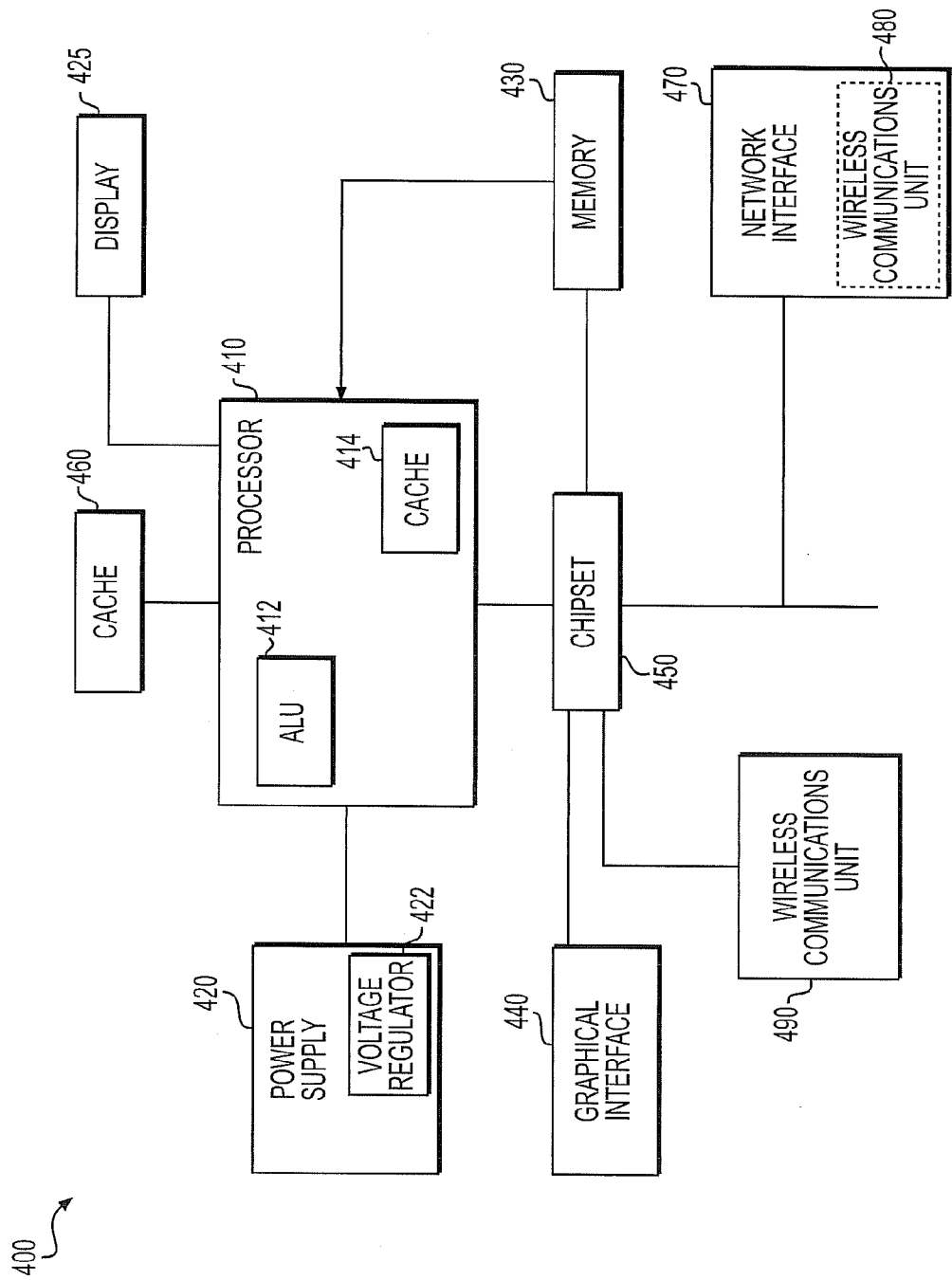
FIG. 5 shows an electronic system according to an example embodiment.

FIG. 5 shows an electronic system according to an example embodiment. Other embodiments and configurations may also be provided.

More specifically, FIG. 5 shows a system 400 that includes a processor 410, a power supply 420, a display 425 and a memory 430, which may be a random access memory, for example. The processor 410 may include an arithmetic logic unit 412 and an internal cache 414, for example. The processor 410 may perform operations discussed above by using received instructions, such as instructions received via a computer-readable medium.

The above-described features may be provided within the electrical system 400 shown in FIG. 4. For example, the battery cell structure may be provided as part of the power supply 420 to provide power to any of the components.

In at least one embodiment, the battery cell structure may be part of the electronic system to provide power to other components.

The voltage regulator 422 may be part of the power supply 420.

The system 400 may also include a graphical interface 440, a chipset 450, a cache 460, a network interface 470 and a wireless communication unit 480, which may be incorporated within the network interface 470. Alternatively or additionally, a wireless communications unit 490 may be coupled to the processor 410, and a direct connection may exist between the memory 430 and the processor 410.

The processor 410 may be a central processing unit, a microprocessor or any other type of processing or computing circuit and may be included on a chip die with all or any combination of the remaining features, or one or more of the remaining features may be electrically coupled to the microprocessor die through known connections and interfaces. Also, the connections that are shown are merely illustrative as other connections between or among the elements depicted may exist depending, for example, on chip platform, functionality, or application requirements.

The following examples pertain to further embodiment.

Example 1 is a battery cell structure comprising: a battery cell, a first pouch layer to substantially surround the battery cell, a second pouch layer to substantially surround the first pouch layer, and a shielding layer in the battery cell structure.

In Example 2, the subject matter of Example 1 can optionally include that a portion of the first pouch layer is between the shielding layer and a portion of the second pouch layer.

In Example 3, the subject matter of Example 1 and Example 2 can optionally include a protective layer between the shielding layer and the portion of the first pouch layer.

In Example 4, the subject matter of Example 1 and Example 3 can optionally include that the protective layer includes aluminum and oxygen.

In Example 5, the subject matter of any one of Examples 1-4 can optionally include that the shielding layer is between a portion of the first pouch layer and a portion of the second pouch layer.

In Example 6, the subject matter of any one of Examples 1-4 can optionally include that the battery cell includes an anode, a cathode and a current collector.

In Example 7, the subject matter of any one of Examples 1-4 can optionally include that the battery cell is a lithium-ion battery cell.

In Example 8, the subject matter of any one of Examples 1-4 can optionally include that the shielding layer includes iron.

Example 9 is an electronic apparatus comprising: a display to display an image, and a battery cell structure that includes a battery cell, a first pouch layer, a second pouch layer, and a shielding layer in the battery cell.

In Example 10, the subject matter of Example 9 can optionally include that the first pouch layer to substantially surround the battery cell, and the second pouch layer to substantially surround the first pouch layer.

In Example 11, the subject matter of Example 9 and Example 10 can optionally include that a portion of the first pouch layer is between the shielding layer and a portion of the second pouch layer.

In Example 12, the subject matter of Example 9 and Example 11 can optionally include that the battery cell structure further includes a protective layer between the shielding layer and the portion of the first pouch layer.

In Example 13, the subject matter of Example 9 and Example 12 can optionally include that the protective layer includes aluminum and oxygen.

In Example 14, the subject matter of any one of Examples 9-13 can optionally include that the shielding layer is between a portion of the first pouch layer and a portion of the second pouch layer.

In Example 15, the subject matter of any one of Examples 9-13 can optionally include that the battery cell includes an anode, a cathode and a current collector.

In Example 16, the subject matter of any one of Examples 9-13 can optionally include that the battery cell is a lithium-ion battery cell.

In Example 17, the subject matter of any one of Examples 9-13 can optionally include that the shielding layer includes iron.

In Example 18, the subject matter of any one of Examples 9-13 can optionally include a wireless receiver including a coil.

Example 19 is an electronic system comprising: a processor to perform an operation, a battery port to receive a battery cell structure, a display to display an image, and a charging device to charge a portion of the battery cell structure, and the battery cell structure to include: a battery cell, a first pouch layer to substantially surround the battery cell, a second pouch layer to substantially surround the first pouch layer, and a shielding layer in the battery cell structure.

In Example 20, the subject matter of Example 19 can optionally include that a portion of the first pouch layer is between the shielding layer and a portion of the second pouch layer.

In Example 21, the subject matter of Example 19 and Example 20 can optionally include that the battery cell structure further includes a protective layer between the shielding layer and the portion of the first pouch layer.

In Example 22, the subject matter of Example 19 and Example 21 can optionally include that the protective layer includes aluminum and oxygen.

In Example 23, the subject matter of any one of Examples 19-22 can optionally include that the shielding layer is between a portion of the first pouch layer and a portion of the second pouch layer.

In Example 24, the subject matter of any one of Examples 19-22 can optionally include that the battery cell includes an anode, a cathode and a current collector.

In Example 25, the subject matter of any one of Examples 19-22 can optionally include that the battery cell is a lithium-ion battery cell.

In Example 26, the subject matter of any one of Examples 19-22 can optionally include that the shielding layer includes iron.

In Example 27, the subject matter of any one of Examples 19-22 can optionally include that the charging device includes a first coil.

In Example 28, the subject matter of Example 19 and Example 27 can optionally include a transmitter device having a second coil to provide a magnetic field based on the first coil and the second coil.

Example 29 is an electronic device comprising: a display to display an image, and first means for powering the display, the first means to include: a battery cell, a first pouch layer to substantially surround the battery cell, a second pouch layer to substantially surround the battery cell, and second means for protecting the battery cell.

In Example 30, the subject matter of Example 29 can optionally include that the first pouch layer to substantially surround the battery cell, and the second pouch layer to substantially surround the first pouch layer.

In Example 31, the subject matter of Example 29 and Example 30 can optionally include that the second means for protecting includes a shielding layer.

In Example 32, the subject matter of Example 29 and Example 31 can optionally include that a portion of the first pouch layer is between the shielding layer and a portion of the second pouch layer.

In Example 33, the subject matter of Example 29 and Example 32 can optionally include that the first means includes a protective layer between the shielding layer and the portion of the first pouch layer.

In Example 34, the subject matter of Example 29 and Example 33 can optionally include that the protective layer includes aluminum and oxygen.

In Example 35, the subject matter of any one of Examples 31-34 can optionally include that the shielding layer is between a portion of the first pouch layer and a portion of the second pouch layer.

In Example 36, the subject matter of any one of Examples 31-34 can optionally include that the battery cell includes an anode, a cathode and a current collector.

In Example 37, the subject matter of any one of Examples 31-34 can optionally include that the battery cell is a lithium-ion battery cell.

In Example 38, the subject matter of any one of Examples 31-34 can optionally include that the shielding layer includes iron.

In Example 39, the subject matter of any one of Examples 29-34 can optionally include a wireless receiver including a coil.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A battery cell structure comprising:
   a battery cell;
   a first pouch layer to substantially surround the battery cell;
   a second pouch layer to substantially surround the first pouch layer;
   a shielding layer in the battery cell structure, wherein a portion of the first pouch layer is between the shielding layer and a portion of the second pouch layer; and
   a protective layer between the shielding layer and the portion of the first pouch layer.

2. The battery cell structure of claim 1, wherein the protective layer includes aluminum and oxygen.

3. The battery cell structure of claim 1, wherein the battery cell is a lithium-ion battery cell.

4. The battery cell structure of claim 1, wherein the shielding layer includes iron.

5. A battery cell structure comprising:
   a battery cell;
   a first pouch layer to substantially surround the battery cell;
   a second pouch layer to substantially surround the first pouch layer; and
   a shielding layer in the battery cell structure, wherein the shielding layer is between a portion of the first pouch layer and a portion of the second pouch layer, and the portion of the first pouch layer is between the battery cell and the shielding layer.

6. An electronic apparatus comprising:
   a display to display an image; and
   a battery cell structure that includes a battery cell, a first pouch layer, a second pouch layer, and a shielding layer in the battery cell, wherein the first pouch layer to substantially surround the battery cell, and the second pouch layer to substantially surround the first pouch layer, wherein a portion of the first pouch layer is between the shielding layer and a portion of the second pouch layer, and wherein the battery cell structure further includes a protective layer between the shielding layer and the portion of the first pouch layer.

7. The apparatus of claim 6, wherein the protective layer includes aluminum and oxygen.

8. The apparatus of claim 6, wherein the battery cell is a lithium-ion battery cell.

9. The apparatus of claim 6, wherein the shielding layer includes iron.

10. An electronic system comprising:
    a processor to perform an operation;
    a battery port to receive a battery cell structure;
    a display to display an image; and
    a charging device to charge a portion of the battery cell structure, and the battery cell structure to include:
    a battery cell,
    a first pouch layer to substantially surround the battery cell,
    a second pouch layer to substantially surround the first pouch layer, and
    a shielding layer in the battery cell structure, wherein a portion of the first pouch layer is between the shielding layer and a portion of the second pouch layer, and wherein the battery cell structure further to include a protective layer between the shielding layer and the portion of the first pouch layer.

11. The system of claim 10, wherein the shielding layer includes iron.

* * * * *